(12) United States Patent
Wang et al.

(10) Patent No.: US 11,379,696 B2
(45) Date of Patent: Jul. 5, 2022

(54) PEDESTRIAN RE-IDENTIFICATION METHOD, COMPUTER DEVICE AND READABLE MEDIUM

(71) Applicant: BEIJING BAIDU NETCOM SCIENCE AND TECHNOLOGY CO., LTD., Beijing (CN)

(72) Inventors: Zhigang Wang, Beijing (CN); Jian Wang, Beijing (CN); Shilei Wen, Beijing (CN); Errui Ding, Beijing (CN); Hao Sun, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 275 days.

(21) Appl. No.: 16/817,419

(22) Filed: Mar. 12, 2020

(65) Prior Publication Data

US 2020/0342271 A1 Oct. 29, 2020

(30) Foreign Application Priority Data

Apr. 29, 2019 (CN) .......................... 201910355601.7

(51) Int. Cl.
*G06K 9/62* (2022.01)
*G06V 10/40* (2022.01)
*G06V 40/10* (2022.01)

(52) U.S. Cl.
CPC .......... *G06K 9/6265* (2013.01); *G06K 9/6256* (2013.01); *G06V 10/40* (2022.01); *G06V 40/103* (2022.01); *G06V 2201/07* (2022.01)

(58) Field of Classification Search
CPC .. G06K 9/6265; G06K 9/6256; G06K 9/6262; G06V 10/40; G06V 40/103;
(Continued)

(56) References Cited

U.S. PATENT DOCUMENTS

2008/0199050 A1* 8/2008 Koitabashi ............. H04N 5/225
382/107
2018/0068448 A1* 3/2018 Rastgar .................. G06V 10/56
(Continued)

FOREIGN PATENT DOCUMENTS

| CN | 107679582 A | 2/2018 |
|---|---|---|
| CN | 107844753 A | 3/2018 |

(Continued)

OTHER PUBLICATIONS

First Office Action from CN app. No. 201910355601.7, dated Dec. 22, 2020, with English translation from Global Dossier.
(Continued)

*Primary Examiner* — Wesley J Tucker
(74) *Attorney, Agent, or Firm* — Ladas & Parry, LLP

(57) ABSTRACT

The present disclosure provides a pedestrian re-identification method and apparatus, computer device and readable medium. The method comprises: collecting a target image and a to-be-identified image including a pedestrian image; obtaining a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image; identifying whether a pedestrian in the to-be-identified image is the same pedestrian as that in the target image according to the feature expression of the target image and the feature expression of the to-be-identified image. According to the pedestrian re-identification method of the present disclosure, the accuracy of the pedestrian re-identification can be effectively improved when the feature extraction model is used to perform the pedestrian re-identification.

20 Claims, 4 Drawing Sheets

(58) Field of Classification Search
CPC .. G06V 2201/07; G06V 10/454; G06V 10/82; G06V 20/52; G06V 40/10

See application file for complete search history.

(56) References Cited

U.S. PATENT DOCUMENTS

| | | |
|---|---|---|
| 2018/0129938 A1 | 5/2018 | Xiong et al. |
| 2019/0019037 A1 | 1/2019 | Kadav et al. |
| 2020/0134321 A1* | 4/2020 | Chen ................. G06V 20/52 |
| 2020/0250461 A1* | 8/2020 | Yang ................... G06T 7/11 |
| 2021/0150194 A1* | 5/2021 | Wang ............... G06V 40/103 |

FOREIGN PATENT DOCUMENTS

| | | |
|---|---|---|
| CN | 108764308 A | 11/2018 |
| CN | 109472248 A | 3/2019 |
| CN | 109543722 A | 3/2019 |
| CN | 109583502 A | 4/2019 |
| CN | 110175527 A | 8/2019 |
| WO | 2018232378 A1 | 12/2018 |

OTHER PUBLICATIONS

Yang et al., "Co-attention network with question type for visual question answering", IEEE Access, p. 40771-40781, vol. 7, Mar. 28, 2019.

Xu Lan et al., "identity alignment by noisy pixel removal, Student, Prof, Collaborator: BMVC Author Guidelines", pp. 1-14, Jul. 7, 2018.

Reid, Video based pedestrian re-recognition (3)—attention mechanism (1), https://blog.cdsn.net/qq_34132310/article/details/88429853, pp. 1-5, Mar. 12, 2019.

Second Office Action and Search Report from CN app. No. 201910355601.7, dated Sep. 3, 2021, with English translation provided by Global Dossier, al pages.

Wu et al., "Deep Co-attention based Comparators For Relative Representation Learning in Person Re-identification", IEEE, Apr. 30, 2018, pp. 1-10.

Lin et al., "Recurrent Models of Visual Co-Attention for Person Re-Identification", Journal of Latex Class Files, vol. 14, No. 8, Nov. 2018, pp. 1-10.

Liu, Haibin, "Research on Visual Question Answering Based on Visual Attention", Jan. 15, 2019, with machine English translation, all pages.

Notice of Allowance for Chinese Patent Application CN201910355601.7 dated Jan. 28, 2022, and its English translation provided by Google.

* cited by examiner

PEDESTRIAN RE-IDENTIFICATION METHOD, COMPUTER DEVICE AND READABLE MEDIUM

The present application claims the priority of Chinese Patent Application No. 201910355601.7, filed on Apr. 29, 2019, with the title of "Pedestrian re-identification method and apparatus, computer device and readable medium". The disclosure of the above application is incorporated herein by reference in its entirety.

FIELD OF THE DISCLOSURE

The present disclosure relates to the technical field of computer application, and particularly to a pedestrian re-identification method and apparatus, computer device and readable medium.

BACKGROUND OF THE DISCLOSURE

Pedestrian re-identification under a cross-camera condition is an important content in the fields such as human body tracking and security monitoring.

At present, there are many solutions to implement the pedestrian re-identification technology. For example, for a pedestrian in a target image captured by a certain camera, whether images captured by other cameras include the pedestrian may be monitored manually to implement pedestrian re-identification. However, such manual monitoring exerts a very large pressure, and is more subjective and less accurate. To overcome drawbacks of manual monitoring, a method of performing pedestrian re-identification based on human body global features is further provided in the prior art. According to the method of performing pedestrian re-identification based on human body global features, global features of pedestrian pictures are extracted by designing a complicated deep classification neural network, or the learning of global features is performed through a metric learning method by pulling pictures of pedestrians with the same identity close and pushing pictures of pedestrians with different identity away in a feature space.

However, the current technical solution of performing pedestrian re-identification based on human body global features is liable to cause identification errors upon processing pedestrians having similar overall appearance and different identity, and causes a lower accuracy of the current pedestrian re-identification solution.

SUMMARY OF THE DISCLOSURE

The present disclosure provides a pedestrian re-identification method and apparatus, computer device and readable medium, to improve the accuracy of the pedestrian re-identification.

The present disclosure provides a pedestrian re-identification method, the method comprising:

collecting a target image and a to-be-identified image including a pedestrian image;

obtaining a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image;

identifying whether a pedestrian in the to-be-identified image is the same pedestrian as that in the target image according to the feature expression of the target image and the feature expression of the to-be-identified image.

The present disclosure further provides a pedestrian re-identification apparatus, the apparatus comprising:

a collection module configured to collect a target image and a to-be-identified image including a pedestrian image;

an extraction module configured to obtain a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image;

an identification module configured to identify whether a pedestrian in the to-be-identified image is the same pedestrian as that in the target image according to the feature expression of the target image and the feature expression of the to-be-identified image.

The present disclosure further provides a computer device, the device comprising:

one or more processors, a memory for storing one or more programs, the one or more programs, when executed by said one or more processors, enable said one or more processors to implement the pedestrian re-identification method stated above.

The present disclosure further provides a computer readable medium on which a computer program is stored, the program, when executed by a processor, implementing the pedestrian re-identification method stated above.

According to the pedestrian re-identification method and apparatus, computer device and readable medium of the present disclosure, the feature extraction model obtained by training based on the self-attention feature of the base image as well as the co-attention feature of the base image relative to the reference image is used to implement the pedestrian re-identification. The feature extraction model can not only extract the detail features of the image itself, but also extract features of the image distinct from other images, to ensure that the feature expressions extracted by the feature extraction model include more detail information of the image, and are more distinguishing. Therefore, the accuracy of the pedestrian re-identification can be effectively improved when the feature extraction model according to the present embodiment is used to perform the pedestrian re-identification.

DETAILED DESCRIPTION OF PREFERRED EMBODIMENTS

The present disclosure will be described in detail with reference to figures and specific embodiments to make objectives, technical solutions and advantages of the present disclosure more apparent.

Artificial intelligence, abbreviated as AI, is a new technological science which researches and develops theories, methods, techniques and application systems for simulating, extending and expanding human intelligence. Artificial intelligence, as a branch of computer science, is intended to learn about essence of intelligence and creates a new intelligent machine which is capable of responding in a manner similar to human intelligence. Research in the field includes robots, language recognition, image recognition, natural language processing, expert systems and the like. In the present disclosure, a feature extraction model is obtained by training by employing a neural network model in the AI field as a prototype, and based on self-attention features of base images as well as co-attention feature of the base images relative to reference images, so that the feature extraction model integrates more detail information which is more distinguishing, such that the performance of pedestrian re-identification may be substantially improved when pedestrian re-identification is performed based on the feature extraction model.

Figure 1:
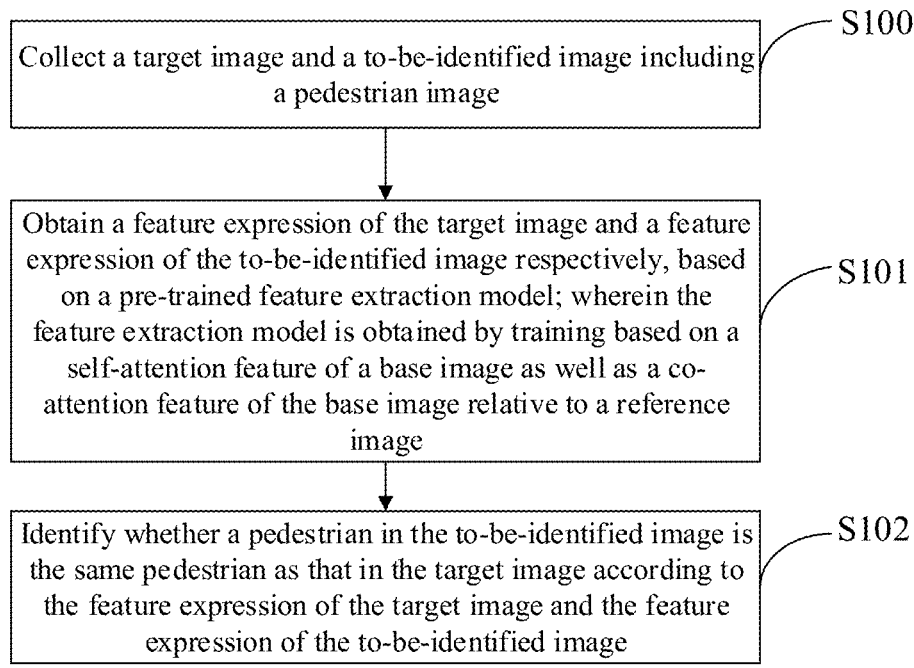
FIG. 1 is a flowchart of Embodiment 1 of a pedestrian re-identification method according to the present disclosure.

FIG. 1 is a flowchart of Embodiment 1 of a pedestrian re-identification method according to the present disclosure. As shown in FIG. 1, the pedestrian re-identification method according to the present embodiment may specifically comprise the following steps:

S100: collecting a target image and a to-be-identified image including a pedestrian image;

A subject for performing the pedestrian re-identification method according to the present embodiment is a pedestrian re-identification apparatus. The pedestrian re-identification apparatus may be independent electronic entity, or an application which is integrated with software and runs on a computer device upon use to implement the pedestrian re-identification.

The pedestrian re-identification method according to the present embodiment is applied to a cross-camera scenario. For example, on a public occasion with a large people flow, an image captured by one of the cameras may be collected as the target image. Then, an image captured by other cameras may be collected as the to-be-identified image. The target image and to-be-identified image both include a pedestrian image. The pedestrian re-identification according to the present embodiment is detecting whether the pedestrian in the to-be-identified image is the same pedestrian as that in the target image. In the present embodiment, it is possible to, based on the same target image, collect a plurality of to-be-identified images captured by a plurality of different cameras, and perform pedestrian re-identification on each to-be-identified image in turn according to the technical solution of the present embodiment.

S101: obtaining a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image.

The feature extraction model employed by the present embodiment is used to extract, from the target image or to-be-identified image, a feature expression that can characterize a corresponding image. Furthermore, the feature extraction model according to the present embodiment is obtained by training based on a self-attention feature of a base image as well as a co-attention feature of the base image relative to a reference image. As such, since the self-attention feature may represent a detail feature that is most typical of identity in the base image, the attention feature is remarkable in the base image; however, the co-attention feature may represent a feature in the base image different from a relatively similar area in the reference image, the feature makes the base image have a certain distinguishing capability as compared with the reference image, so that the trained feature extraction model is used to extract the feature expression for the image, it can not only extract the detail features of the image itself, but also extract features of the image distinct from other images, to ensure that the global feature expressions extracted by the feature extraction model include more detail information of the image, and are more distinguishing, and thereby can improve the accuracy of pedestrian re-identification.

S102: identify whether a pedestrian in each to-be-identified image is the same pedestrian as that in the target image according to the feature expression of the target image and the feature expression of the to-be-identified image.

The feature expression output by the feature extraction model in the present embodiment upon use may include feature expressions in different forms.

For example, if the feature expression output upon use is a basic feature expression and the basic feature expression may be a 3-dimensional matrix, at this time it is necessary to, before identifying whether a pedestrian in each to-be-identified image is the same pedestrian as that in the target image according to the feature expression of the target image and the feature expression of the to-be-identified image, perform a global pooling operation for the basic feature expression of the target image and the basic feature expression of the to-be-identified image respectively, to obtain the global feature expression of the target image and the global feature expression of the to-be-identified image. The global feature expression is a one-dimensional vector. At this time, it is possible to, by referring to a similarity calculation manner of the vector, calculate a similarity between the global feature expression of the target image and the global feature expression of the to-be-identified image; judge whether the similarity is greater than a preset similarity threshold, and if yes, determine that the pedestrian in the corresponding to-be-identified image is the same pedestrian as that in the target image; otherwise, determine that the pedestrian in the corresponding to-be-identified image is not the same pedestrian as that in the target image. The feature extraction model in the present embodiment is a deep neural network model.

The similarity threshold in the present embodiment may be set according to actual needs, and may be specifically a value greater than or equal to 0.5, and less than 1.

The basic feature expression in the present embodiment includes the most detailed and richest feature information of the target image, whereas the global feature expression may be believed as a more macro and more generalized feature expression. The basic feature expression and the global feature expression express the feature information of the image from different angles.

In addition, optionally, in the present embodiment, the global pooling operation may be provided in the feature extraction model upon pedestrian re-identification, that is, in the feature extraction model, aft the basic feature expression in the form of a 3-dimensional matrix is extracted based on each image, the global pooling operation is performed first to obtain the global feature expression in the form of a one-dimensional vector, and then the global feature expression is output. That is, upon use, what is directly output by the feature extraction model is the global feature expression.

As such, in step S101, the global feature expression of the target image and the global feature expression of the to-be-identified image output by the feature extraction model are both in the form of a one-dimensional vector. At this time, it is feasible to, by directly referring to a similarity calculation manner of the vector, calculate a similarity between the global feature expression of the target image and the global feature expression of the to-be-identified image; judge whether the similarity is greater than a preset similarity threshold, and if yes, determine that the pedestrian in the corresponding to-be-identified image is the same pedestrian as that in the target image; otherwise, determine that the pedestrian in the corresponding to-be-identified image is not the same pedestrian as that in the target image.

According to the pedestrian re-identification method of the present embodiment, the feature extraction model in the above embodiment is employed to implement the pedestrian re-identification. The feature extraction model according to the present embodiment can not only extract the detail features of the image itself, but also extract features of the image distinct from other images, to ensure that the global feature expressions extracted by the feature extraction model include more detail information of the image, and are more distinguishing. Therefore, the accuracy of the pedestrian re-identification can be effectively improved when the feature extraction model according to the present embodiment is used to perform the pedestrian re-identification.

Figure 2:
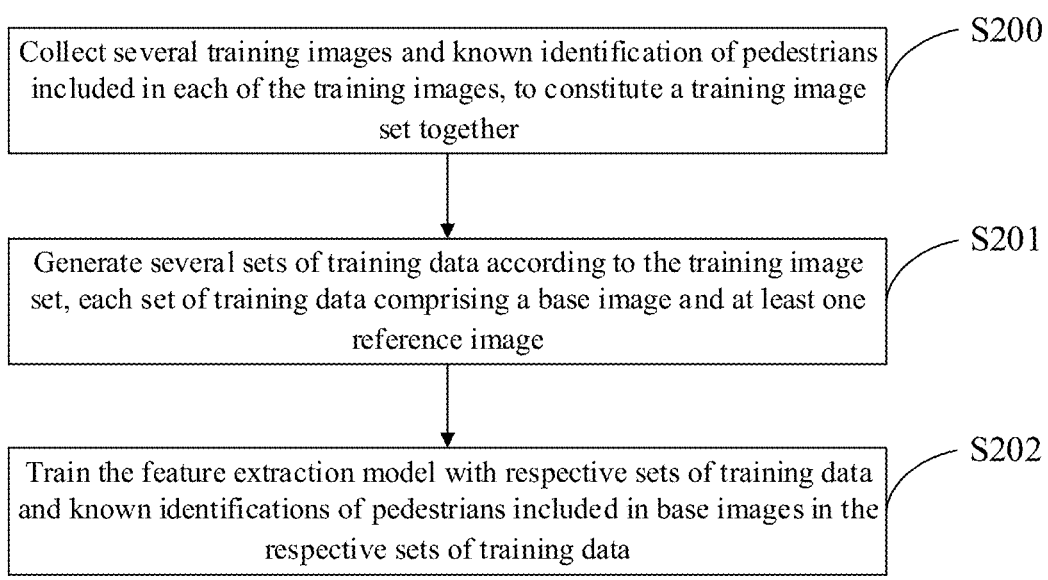
FIG. 2 is a flowchart of Embodiment 2 of a pedestrian re-identification method according to the present disclosure.

FIG. 2 is a flowchart of Embodiment 2 of a pedestrian re-identification method according to the present disclosure. As shown in FIG. 2, the pedestrian re-identification method according to the present embodiment introduces in detail a process of training the feature extraction model employed in the embodiment shown in FIG. 1, on the basis of the technical solution of the embodiment shown in FIG. 1. The pedestrian re-identification method according to the present embodiment may specifically comprise the following steps:

S200: collecting several training images and known identification of pedestrians included in each training image, to constitute a training image set together;

The feature extraction model trained in the present embodiment is mainly applied under a cross-camera scenario upon performing the pedestrian re-identification. Therefore, the several training images collected in the present embodiment may specifically be images collected by different cameras, to more accurately train the feature extraction model employed to implement the pedestrian re-identification. The training images collected in the present embodiment must include pedestrian information, and furthermore, in the training image set, known identification of pedestrians included in each training image needs to be annotated, and known identification of pedestrians is used to solely identify information of the identity of the pedestrian in the corresponding image. Therefore, known identifications corresponding to different pedestrians are different. Known identification of pedestrians may employ a combination of character, letter and/or number, and is not limited herein.

S201: generating several sets of training data according to the training image set, each set of training data comprising a base image and at least one reference image;

In the present embodiment, when the feature extraction model is trained, the training data are required to include two portions, namely, the base image and the reference image, to achieve the training based on the co-attention feature of the base image relative to the reference image. Therefore, several sets of training data need to be generated according to the training image set before the training. Each set of training data includes a base image and at least one reference image. It needs to be appreciated that in the present embodiment, if each set of training data only includes one reference image, the known identification of the pedestrian included by the reference image had better be different from the known identification of the pedestrian included in the base image, namely, the pedestrians included in the reference image and base image are not the same person, to ensure the training effect. If each set of training data includes a plurality of reference images, the known identification of the pedestrian in a portion of the plurality of reference images is the same as the known identification of the base image, and the known identification of the pedestrian in another portion of the plurality of reference images is different from the known identification in the base image, i.e., the pedestrians included in partial reference images and the base image are the same person, and the pedestrians included in another portion of reference images and the base image are not the same person.

There are several training images in the training image set of the present embodiment. When the training data sets are generated, each training image may alternatingly assume the roles of the base image and reference image in different training data sets.

S202: training a feature extraction model with respective sets of training data and known identifications of pedestrians included in base images in the respective sets of training data.

For example, upon implementation, step S202 of the present embodiment at least comprises the training in the following two manners, namely, training based on the self-attention feature and based on the co-attention feature:

The first manner: for the sets of training data, training the feature extraction model based on the self-attention features of the base images in the corresponding training data;

The second manner: training the feature extraction model based on the co-attention features of the base images in the corresponding training data relative to the respective reference images.

Wherein the first manner may specifically include the following steps upon implementation:

(a1) for the sets of training data, inputting the base images in the corresponding training data into the feature extraction model, and obtaining basic feature expressions and search expressions of the base images output by the feature extraction model, wherein the search expressions of the base images are obtained by performing a global pooling operation for the basic feature expressions of the base images to obtain global feature expressions, and then performing feature transformation;

In the present embodiment, the basic feature expression of the base image output by the feature extraction image may be a global feature graph, and may be specifically represented with a 3-dimensional matrix. The global feature graph may include the most comprehensive feature information of the base image. The basic feature expression may include feature information of each detail in the base image, and the included feature information is very rich and comprehensive in content. In the present embodiment, it is further possible to perform a global pooling operation for the basic feature expression to obtain the global feature expression in the form of a one-dimensional vector, also referred to as a global feature vector, the global feature expression only including a macro feature of the base image. The search expression in the present embodiment may be considered as a feature which is extracted by the feature extraction model from the base image, is relatively obvious, attracts certain attention, shows certain discrimination, and facilitate searching. For example, in the field of pedestrian re-identification of the present embodiment, the search expression may be a relatively obvious feature in the area where the pedestrian in the base image lies, for example, the pedestrian's dress, hat and other relatively obvious features. Therefore, relative to the global feature expression, the search expression includes less feature information which is relatively summarized and general. The search expression may be represented with a one-dimensional vector, and the search expression of the present embodiment may be a feature transformation of the global feature expression.

Optionally, in practical application, the search expression may also directly employ the global feature expression without undergoing the feature transformation. Alternatively, it is also possible to, on the basis of the global feature expression, add at least one fully-connected neural network layer to perform the feature transformation to obtain the search expression.

Furthermore, it is verified through experiments that the feature extraction model trained in a way that the search expression employs the feature expression resulting from the feature transformation of the global feature expression is better in performance than the feature extraction model trained in a way that the search expression directly employs the global feature expression.

(b1) obtaining, from the basic feature expression of the base image, a feature complying with the search expression of the base image as the self-attention feature of the base image;

Since the basic feature expression includes rich feature information, a detailed feature within a range limited by the search expression may be obtained from the basic feature expression of the base image according to the search expression, as the self-attention feature of the base image in the present embodiment. The self-attention feature may be the most distinguishing feature from the angle of the base image itself. That is to say, the search expression of the base image searches the basic feature expression of itself, and the extracted feature is a relatively significant feature of itself, namely, the self-attention feature of the base image.

(c1) inputting the self-attention feature of the base image into a first identity identifier, the first identity identifier predicting a first prediction identification of the pedestrian in the base image according to the self-attention feature of the base image;

(d1) detecting whether the first prediction identification is consistent with the known identification, and if not consistent, adjusting the feature extraction model and parameters of the first identity identifier so that the first prediction identification tends to be consistent with the known identification.

Steps (c1) and (d1) are a step of training operation with the self-attention feature, specifically, inputting the self-attention feature of the base image into the first identity identifier, the first identity identifier predicting the first prediction identification of the pedestrian in the base image according to the self-attention feature of the base image; then detecting whether the first prediction identification is consistent with the known identification, and if not consistent, adjusting the feature extraction model and parameters of the first identity identifier so that the first prediction identification tends to be consistent with the known identification.

The second manner may specifically include the following steps upon implementation:

(a2) for each reference image in each set of training data, inputting the reference image into the feature extraction model, and obtaining the search expression of the reference image output by the feature extraction model;

(b2) obtaining, from the basic feature expression of a corresponding base image, a feature complying with the search expression of the reference image as the co-attention feature of the base image relative to the reference image;

(c2) inputting the co-attention feature into a second identity identifier, the second identity identifier predicting a second prediction identification of the pedestrian in the base image according to the co-attention feature;

(d2) detecting whether the second prediction identification is consistent with the known identification, and if not consistent, adjusting the feature extraction model and parameters of the second identity identifier so that the second prediction identification tends to be consistent with the known identification.

Steps (a2)-(d2), by taking one reference image as an example, describe one step of operation of training the feature extraction model based on the co-attention feature. For each reference image in each set of training data, the reference image is input into the feature extraction model. In this training manner, only the search expression of the reference image output by the feature extraction model is obtained, without need to concern the basic feature expression of the reference image. If the pedestrians in the base image and reference image have certain similarity, it may be believed that what are obtained by the search expression of the base image and the search expression of the reference image are information of similar areas. Then, in the present embodiment, a feature complying with the search expression of the reference image is obtained from the basic feature expression of the base image, as the co-attention feature of the base image relative to the reference image. This is equivalent to mining detailed information of a similar area in the base image, and the feature of this portion of area, namely, the co-attention feature, has a certain distinguishing capability for similar areas of different images. That is to say, the search expression of the reference image searches the basic feature expression of the base image, and what is extracted is the feature of relatively similar areas in appearance of the based image and the reference image, namely, the co-attention feature of the base image.

Upon specific training, the co-attention feature of the base image relative to each reference image is input into the second identity identifier, and the second identity identifier predicts the second prediction identification of the pedestrian in the base image according to the co-attention feature; detection is performed as to whether the second prediction identification is consistent with the known identification, and if not consistent, the feature extraction model and parameters of the second identity identifier are adjusted so that the second prediction identification tends to be consistent with the known identification.

It needs to be appreciated that in practical application, a second identity identifier needs to be configured for each reference image in each set of training data. The number of the second identity identifiers needs to be configured according to the number of the reference images existing in each set of training data.

If step S202 only includes the training in the above first manner and second manner, it is possible to constantly perform training with the sets of training data collected in the present embodiment according to the above steps (a1)-(d1), and (a2)-(d2), and constantly adjust parameters of the feature extraction model, the first identity identifier and the second identity identifiers so that the first prediction identification of the first identity identifier is consistent with the known identification, and the second prediction identifications of the second identity identifiers are consistent with the known identification, whereupon the training is completed, and parameters of the feature extraction model are determined and thereby the feature extraction model is determined.

Further optionally, step S202 of the present embodiment may further include the following at least one manner of training, in addition to the training in the above first manner and second manner.

The third manner: for each set of training data, inputting the search expression of the base image in the training data into a third identity identifier, the third identity identifier predicting a third prediction identification of the pedestrian in the base image according to the search expression of the base image; detecting whether the third prediction identification is consistent with the known identification, and if not consistent, adjusting the feature extraction model and parameters of the third identity identifier so that the third prediction identification tends to be consistent with the known identification.

The fourth manner: performing a global pooling operation for the basic feature expression of the base image to obtain a global feature expression, inputting the global feature expression into a fourth identity identifier, the fourth identity identifier predicting a fourth prediction identification of the pedestrian in the base image according to the global feature expression; detecting whether the fourth prediction identification is consistent with the known identification, and if not consistent, adjusting the feature extraction model and parameters of the fourth identity identifier so that the fourth prediction identification tends to be consistent with the known identification.

The above third manner and fourth manner may be, alone or together, combined with the above first manner and second manner, to form the training solution of the feature extraction model of the present embodiment.

Furthermore, in both the third manner and fourth manner, the feature extraction model is trained based on the feature information of the base image. For example, in the third manner, the third identity identifier is introduced, the search expression of the base image in the training data is directly input into the third identity identifier, and the third identity identifier predicts the third prediction identification of the pedestrian in the base image according to the search expression of the base image; if it is detected that the third prediction identification is not consistent with the known identification, the feature extraction model and parameters of the third identity identifier are adjusted so that the third prediction identification tends to be consistent with the known identification. The above process is one time of training process, and each time of training process is on the same principle. Likewise, in the fourth manner, first it is necessary to perform a global pooling operation for the basic feature expression of the base image to obtain a global feature expression in the form of a one-dimensional vector.

Likewise, in the fourth manner, the fourth identity identifier is introduced, then the global feature expression is input into the fourth identity identifier, the fourth identity identifier predicts the fourth prediction identification of the pedestrian in the base image according to the input information; if it is detected that the fourth prediction identification is not consistent with the known identification, the feature extraction model and parameters of the fourth identity identifier are adjusted so that the fourth prediction identification tends to be consistent with the known identification. The above process is one time of training process, and each time of training process is on the same principle.

If step S202 further includes the training in the third manner and fourth manner in addition to the training in the above first manner and second manner, at this time it is possible to perform training in the above third manner and fourth manner whole performing training with the sets of training data collected in the present embodiment according to the above steps (a1)-(d1), and (a2)-(d2), and constantly adjust parameters of the feature extraction model, the first identity identifier, the second identity identifiers, the third identity identifier and the fourth identity identifier so that the first prediction identification of the first identity identifier is consistent with the known identification, and the second prediction identifications of the second identity identifiers are consistent with the known identification, the third prediction identification of the third identity identifier is consistent with the known identification, and the fourth prediction identification of the fourth identity identifier is consistent with the known identification, whereupon the training is completed, and parameters of the feature extraction model are determined and thereby the feature extraction model is determined. Optionally, the training branches corresponding to the above third manner and fourth manner may also exist in the alternative only, and are implemented on the same principle, which will not be detailed any more here.

The first identity identifier, the second identity identifiers, the third identity identifier and the fourth identity identifier all are implemented with a neural network model. In the present embodiment, the output of the respective identity identifier may be a 1*n vector, wherein n may be the number of pedestrians involved in the training image set. Correspondingly, a value of each element in the vector output by the identity identifiers may be a probability of the pedestrian corresponding to the predicted position. Upon training, a pedestrian identification corresponding to a position with the largest probability in the vector output by the identity identifier may be selected as the prediction identification.

A subject for performing the pedestrian re-identification method of the present embodiment may be consistent with the above FIG. 1, and the method is implemented by the pedestrian re-identification apparatus. That is, the pedestrian re-identification apparatus first trains the feature extraction model, and then the pedestrian re-identification apparatus implements the pedestrian re-identification based on the duly-trained feature extraction model by employing the technical solution of the embodiment shown in FIG. 1.

Alternatively, the subject for performing the pedestrian re-identification method of the present embodiment may be different from the subject of the embodiment shown in FIG. 1, and is a training device of the feature extraction model independent from the pedestrian re-identification apparatus. Upon specific use, the training device of the feature extraction model first trains the feature extraction model, and then the pedestrian re-identification apparatus, upon performing pedestrian re-identification, directly invokes the duly-trained feature extraction model and implements the pedestrian re-identification with the technical solution of the embodiment shown in FIG. 1.

According to the pedestrian re-identification method of the present embodiment and with the above technical solution, a feature extraction model with excellent feature extraction performance may be trained to ensure that the global feature expression extracted by the feature extraction model can include more detail information of the image and is more distinguishing so as to effectively improve the accuracy of the pedestrian re-identification when the pedestrian re-identification is performed based on the feature extraction model subsequently.

Figure 3:
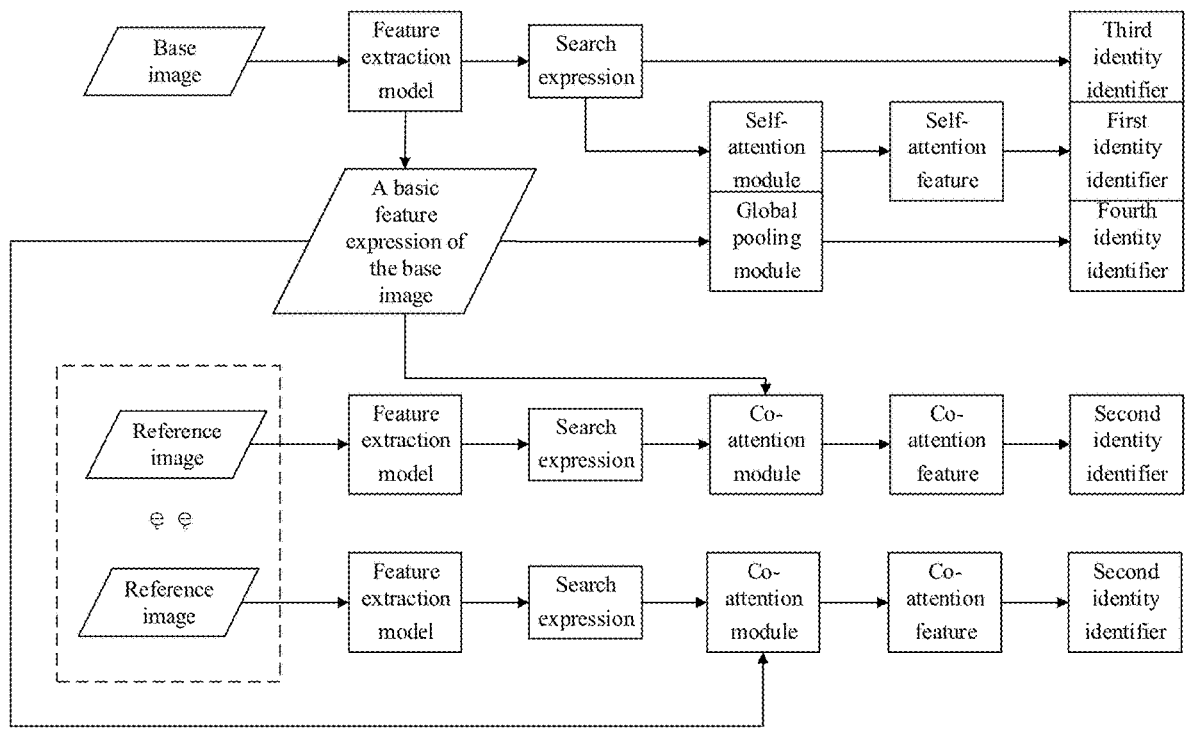
FIG. 3 is a schematic diagram of a training principle of a feature extraction model provided by the present disclosure.

For example, FIG. 3 is a schematic diagram of a training principle of a feature extraction model provided by the present disclosure. As shown in FIG. 3, the training process of the feature extraction model provided by the present embodiment includes the above first manner, second manner, third manner and fourth manner at the same time as an example. In the training in the second manner, an example is taken in which each set of training data includes two reference images, and the pedestrians in the two reference images are both not the same person as the pedestrian in the base image, and the thus-trained feature extraction model has a better performance. In practical application, each set of training data may include only one reference image or a plurality of reference images. When each set of training data includes a plurality of reference images, it is required that the plurality of reference images must include reference images including a pedestrian not the same person as the pedestrian in the base image, to ensure the performance of the trained feature extraction model.

A self-attention module in FIG. 3 is configured to obtain, from the basic feature expression of the base image, a feature complying with the search expression of the base image as the self-attention feature of the base image. A global pooling module is configured to perform a global pooling operation for the basic feature expression of the base image to obtain the global feature expression of the base image. A co-attention module is configured to obtain, from the basic feature expression of the base image, a feature complying with the search expression of the reference image as the co-attention feature of the base image relative to the reference image.

In the training process shown in FIG. 3, training is performed with the sets of training data in the four training manners shown in the figure at the same time. The training manners coexist simultaneously and constrain one another. The training ends only when the prediction identifications output by the first identity identifier, the second identity identifiers, the third identity identifier and fourth identity identifier are all consistent with the known identification. At this time, the parameters of the feature extraction model can be determined and thereby the feature extraction model can be determined. In practical application, the training in the third manner and/or fourth manner in FIG. 3 may be removed. The implementation principle of the specific training process is the same as the first manner, second manner, third manner and fourth manner stated in the embodiment shown in the above FIG. 2. Reference may also be made to related depictions of the above embodiment for details, and detailed depictions are not presented here any more.

Figure 4:
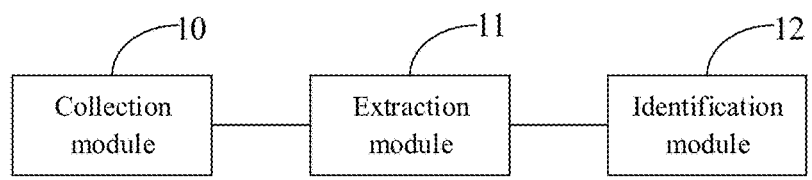
FIG. 4 is a structural diagram of Embodiment 1 of a pedestrian re-identification apparatus according to the present disclosure.

FIG. 4 is a structural diagram of Embodiment 1 of a pedestrian re-identification apparatus according to the present disclosure. As shown in FIG. 4, the pedestrian re-identification apparatus of the present embodiment may specifically comprises:

a collection module 10 configured to collect a target image and a to-be-identified image including a pedestrian image;

an extraction module 11 configured to, based on a pre-trained feature extraction model, obtain a feature expression of the target image and a feature expression of the to-be-identified image collected by the collecting module 10 respectively; wherein the feature extraction model is obtained by training based on a self-attention feature of a base image as well as a co-attention feature of the base image relative to a reference image;

an identification module 12 configured to identify whether a pedestrian in the to-be-identified image is the same pedestrian as that in the target image according to the feature expression of the target image and the feature expression of the to-be-identified image extracted by the extraction module 11.

Principles employed by the pedestrian re-identification apparatus according to the present embodiment to implement pedestrian re-identification by using the above modules and the resultant technical effects are the same as those of the above-mentioned method embodiments. For particulars, please refer to the depictions of the aforesaid relevant method embodiments, and no detailed depictions will be presented here.

Further optionally, the identification module 12 in the embodiment shown in FIG. 4 is specifically configured to:

if the feature expression extracted by the extraction module 11 is a global feature expression, calculate a similarity between the global feature expression of the target image and the global feature expression of the to-be-identified image;

judge whether the similarity is greater than a preset similarity threshold, and if yes, determine that the pedestrian in the corresponding to-be-identified image is the same pedestrian as that in the target image.

Further optionally, the identification module 12 is further configured to: if the feature expression extracted by the extraction module 11 is the basic feature expression, perform a global pooling operation for the basic feature expression of the target image and the basic feature expression of the to-be-identified image respectively, to obtain the global feature expression of the target image and the global feature expression of the to-be-identified image, to facilitate subsequent calculation of the similarity between the global feature expression of the target image and the global feature expression of the to-be-identified image based on the global feature expression after the global pooling operation.

Figure 5:
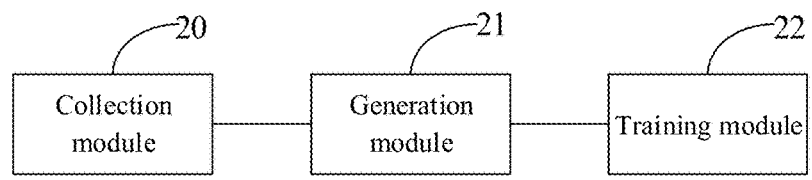
FIG. 5 is a structural diagram of Embodiment 2 of a pedestrian re-identification apparatus according to the present disclosure.

FIG. 5 is a structural diagram of Embodiment 2 of a pedestrian re-identification apparatus according to the present disclosure. As shown in FIG. 5, the pedestrian re-identification apparatus of the present embodiment may specifically comprises:

a collection module 20 configured to collect several training images and known identification of pedestrians included in each training image, to constitute a training image set together;

a generation module 21 configured to generate several sets of training data according to the training image set collected by the collection module 20, each set of training data comprising a base image and at least one reference image;

a training module 22 configured to train a feature extraction model with respective sets of training data generated by the generation module 21 and known identifications of pedestrians included in base images in the respective sets of training data.

Principles employed by the pedestrian re-identification apparatus according to the present embodiment to implement pedestrian re-identification by using the above modules and the resultant technical effects are the same as those of the above-mentioned method embodiments. For particulars, please refer to the depictions of the aforesaid relevant method embodiments, and no detailed depictions will be presented here.

Figure 6:
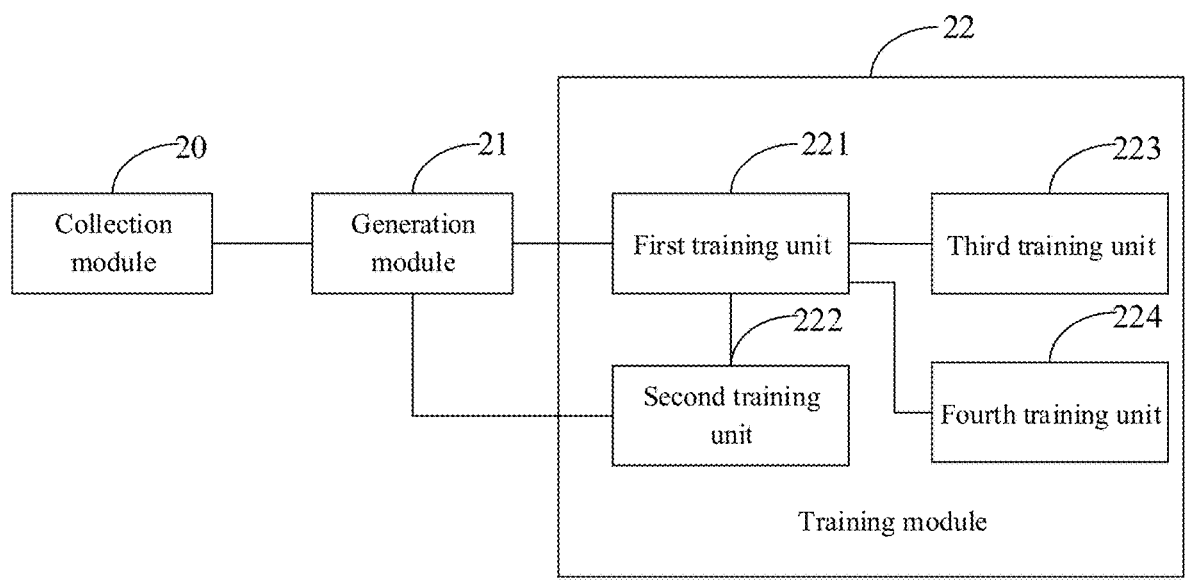
FIG. 6 is a structural diagram of Embodiment 3 of a pedestrian re-identification apparatus according to the present disclosure.

FIG. 6 is a structural diagram of Embodiment 3 of a pedestrian re-identification apparatus according to the present disclosure. As shown in FIG. 6, the pedestrian re-identification apparatus according to the present embodiment is described on the basis of the technical solution of the embodiment shown in the above FIG. 5 to further introduce the technical solution of the present disclosure in more detail.

As shown in FIG. 6, in the pedestrian re-identification apparatus of the present embodiment, the training module 22 comprises:

a first training unit 221 configured to, for the sets of training data generated by the generation module 21, train the feature extraction model based on the self-attention features of the base images in the corresponding training data;

a second training unit 222 configured to train the feature extraction model based on the co-attention features of the base images in the corresponding training data relative to the respective reference images.

Furthermore optionally, the first training unit 221 is specifically configured to:

for the sets of training data, input the base images in the corresponding training data into the feature extraction model, and obtain basic feature expressions and search expressions of the base images output by the feature extraction model, wherein the search expressions of the base images are obtained by performing a global pooling operation for the basic feature expressions of the base images to obtain global feature expressions, and then performing feature transformation;

obtain, from the basic feature expression of the base image, a feature complying with the search expression of the base image as the self-attention feature of the base image;

input the self-attention feature of the base image into a first identity identifier, the first identity identifier predicting a first prediction identification of the pedestrian in the base image according to the self-attention feature of the base image;

detect whether the first prediction identification is consistent with the known identification, and if not consistent, adjust the feature extraction model and parameters of the first identity identifier so that the first prediction identification tends to be consistent with the known identification.

Furthermore optionally, the second training unit 222 is specifically configured to:

for each reference image in each set of training data generated by the generation module 21, input the reference image into the feature extraction model, and obtain the search expression of the reference image output by the feature extraction model;

obtain, from the basic feature expression of a corresponding base image obtained by the first training unit 221, a feature complying with the search expression of the reference image as the co-attention feature of the base image relative to the reference image;

input the co-attention feature into a second identity identifier, the second identity identifier predicting a second prediction identification of the pedestrian in the base image according to the co-attention feature;

detect whether the second prediction identification is consistent with the known identification, and if not consistent, adjust the feature extraction model and parameters of the second identity identifier so that the second prediction identification tends to be consistent with the known identification.

Further optionally, the training module 22 further comprises the following at least one unit:

a third training unit 223 configured to, for each set of training data generated by the generation module 21, input the search expression of the base image in the training data obtained by the first training unit 221 into a third identity identifier, the third identity identifier predicting a third prediction identification of the pedestrian in the base image according to the search expression of the base image; detect whether the third prediction identification is consistent with the known identification, and if not consistent, adjust the feature extraction model and parameters of the third identity identifier so that the third prediction identification tends to be consistent with the known identification; and a fourth training unit 224 configured to perform a global pooling operation for the basic feature expression of the base image obtained by the first training unit 221 to obtain a global feature expression, input the global feature expression into a fourth identity identifier, the fourth identity identifier predicting a fourth prediction identification of the pedestrian in the base image according to the global feature expression after the global pooling operation; detect whether the fourth prediction identification is consistent with the known identification, and if not consistent, adjust the feature extraction model and parameters of the fourth identity identifier so that the fourth prediction identification tends to be consistent with the known identification.

In the embodiment shown in FIG. 6, an example is taken in which the training module 22 simultaneously comprises the third training unit 223 and the fourth training unit 224. In practical application, the third training unit 223 and fourth training unit 224 may also exist in the alternative only.

Principles employed by the pedestrian re-identification apparatus according to the present embodiment to implement pedestrian re-identification by using the above modules and the resultant technical effects are the same as those of the above-mentioned method embodiments. For particulars, please refer to the depictions of the aforesaid relevant method embodiments, and no detailed depictions will be presented here.

It needs to be appreciated that the pedestrian re-identification apparatuses in the embodiments shown in FIG. 5 and FIG. 6 may exist independently or may be respectively combined with the above FIG. 4 to form an optional embodiment of the present disclosure. When the pedestrian re-identification of FIG. 5 is used in combination with FIG. 4, two collection modules therein may be combined into one.

Figure 7:
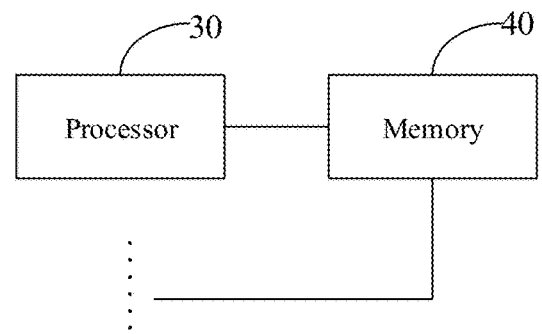
FIG. 7 is a structural diagram of an embodiment of a computer device according to the present disclosure.

FIG. 7 is a structural diagram of an embodiment of a computer device according to the present disclosure. As shown in FIG. 7, the computer device according to the present embodiment comprises: one or more processors 30, and a memory 40 for storing one or more programs; the one or more programs stored in the memory 40, when executed by said one or more processors 30, enable said one or more processors 30 to implement the pedestrian re-identification method of the embodiments shown in FIG. 1 to FIG. 2. In the embodiment as shown FIG. 7, an example is taken in which the computer device comprises a plurality of processors 30.

Figure 8:
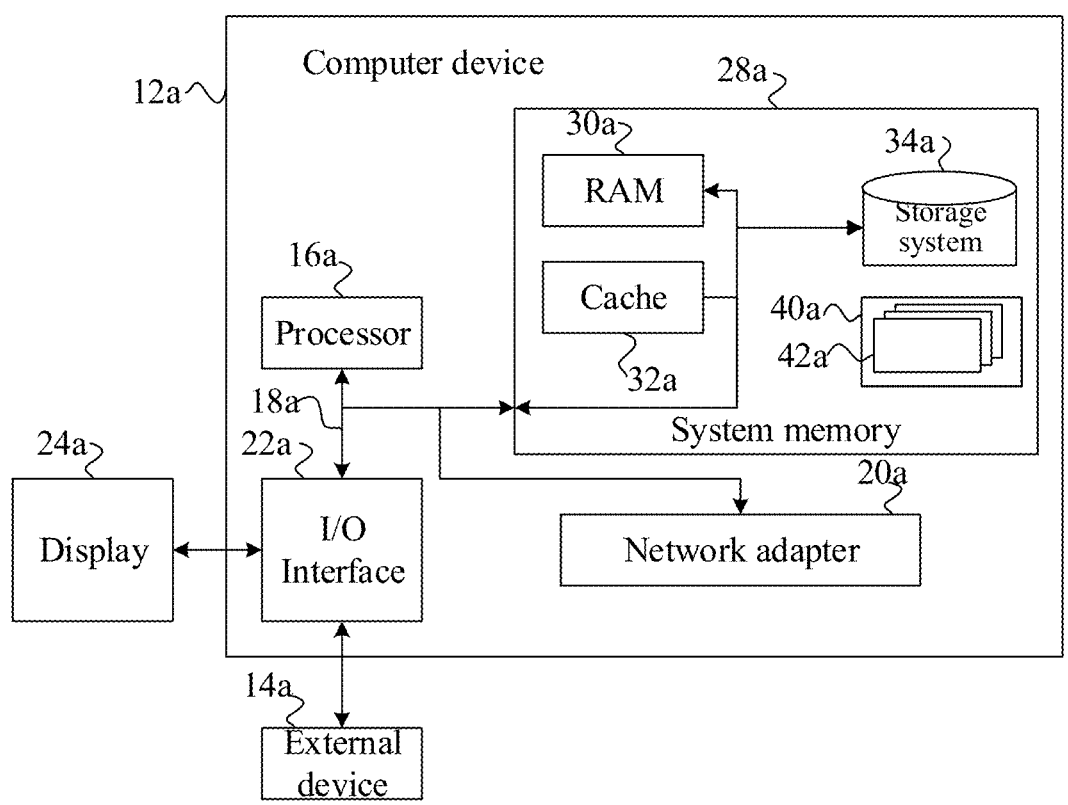
FIG. 8 is an example diagram of a computer device according to the present disclosure.

For example, FIG. 8 is an example diagram of a computer device according to an embodiment of the present disclosure. FIG. 8 shows a block diagram of an example computer device 12a adapted to implement an implementation mode of the present disclosure. The computer device 12a shown in FIG. 8 is only an example and should not bring about any limitation to the function and scope of use of the embodiments of the present disclosure.

As shown in FIG. 8, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1 to FIG. 6 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in the above FIG. 1 and FIG. 5-FIG. 7 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc. The processor 16a executes various function applications and data processing by running programs stored in the system memory 28a, for example, implements the pedestrian re-identification method shown in the above embodiments.

The present disclosure further provides a computer readable medium on which a computer program is stored, the program, when executed by a processor, implementing the pedestrian re-identification method stated in the above embodiments.

The computer readable medium of the present embodiment may include RAM 30a, and/or cache memory 32a and/or a storage system 34a in the system memory 28a in the embodiment shown in FIG. 8.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A pedestrian re-identification method, wherein the method comprises:
    collecting a target image and a to-be-identified image including a pedestrian image;
    obtaining a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image, wherein a feature complying with a search expression of the base image is obtained, from a basic feature expression of the base image, as the self-attention feature of the base image, wherein the search expression of the base image is obtained by performing a global pooling operation for the basic feature expression of the base image to obtain global feature expressions, and then performing feature transformation;
    identifying whether a pedestrian in the to-be-identified image is the same pedestrian as that in the target image according to the feature expression of the target image and the feature expression of the to-be-identified image.

2. The method according to claim 1, wherein the identifying whether a pedestrian in the to-be-identified image is the same pedestrian as that in the target image according to the feature expression of the target image and the feature expression of the to-be-identified image comprises:
    if the feature expression is a global feature expression, calculating a similarity between the global feature expression of the target image and the global feature expression of the to-be-identified image;
    judging whether the similarity is greater than a preset similarity threshold, and if yes, determining that the pedestrian in the corresponding to-be-identified image is the same pedestrian as that in the target image.

3. The method according to claim 2, wherein before the step of, if the feature expression is a basic feature expression, calculating a similarity between the global feature expression of the target image and the global feature expression of the to-be-identified image, the method further comprises:
    performing a global pooling operation for the basic feature expression of the target image and the basic feature expression of the to-be-identified image respectively, to obtain the global feature expression of the target image and the global feature expression of the to-be-identified image.

4. The method according to claim 1, wherein before the obtaining a feature expression of the target image and a feature expression of the to-be-identified image respectively, based on a pre-trained feature extraction model, the method further comprises:
    collecting several training images and known identification of pedestrians included in each of the training images, to constitute a training image set together;
    generating several sets of training data according to the training image set, each set of training data comprising a base image and at least one reference image;
    training the feature extraction model with respective sets of training data and known identifications of pedestrians included in base images in the respective sets of training data.

5. The method according to claim 4, wherein the training the feature extraction model with respective sets of training data and known identifications of pedestrians included in base images in the respective sets of training data comprises:
    for the sets of training data, training the feature extraction model based on the self-attention features of the base images in the corresponding training data;
    training the feature extraction model based on the co-attention features of the base images in the corresponding training data relative to the respective reference images.

6. The method according to claim 5, wherein the step of, for the sets of training data, training the feature extraction model based on the self-attention features of the base images in the corresponding training data comprises:
  for the sets of training data, inputting the base images in the corresponding training data into the feature extraction model, and obtaining basic feature expressions and search expressions of the base images output by the feature extraction model;
  inputting the self-attention feature of the base image into a first identity identifier, the first identity identifier predicting a first prediction identification of the pedestrian in the base image according to the self-attention feature of the base image;
  detecting whether the first prediction identification is consistent with the known identification, and if not consistent, adjusting the feature extraction model and parameters of the first identity identifier so that the first prediction identification tends to be consistent with the known identification.

7. The method according to claim 6, wherein the training the feature extraction model based on the co-attention features of the base images in the corresponding training data relative to the respective reference images comprises:
  for each of the reference images in each set of training data, inputting the reference image into the feature extraction model, and obtaining the search expression of the reference image output by the feature extraction model;
  obtaining, from the basic feature expression of a corresponding base image, a feature complying with the search expression of the reference image as the co-attention feature of the base image relative to the reference image;
  inputting the co-attention feature into a second identity identifier, the second identity identifier predicting a second prediction identification of the pedestrian in the base image according to the co-attention feature;
  detecting whether the second prediction identification is consistent with the known identification, and if not consistent, adjusting the feature extraction model and parameters of the second identity identifier so that the second prediction identification tends to be consistent with the known identification.

8. The method according to claim 6, wherein the training the feature extraction model with respective sets of training data and known identifications of pedestrians included in base images in the respective sets of training data further comprises at least one of the following:
  for each set of training data, inputting the search expression of the base image in the training data into a third identity identifier, the third identity identifier predicting a third prediction identification of the pedestrian in the base image according to the search expression of the base image; detecting whether the third prediction identification is consistent with the known identification, and if not consistent, adjusting the feature extraction model and parameters of the third identity identifier so that the third prediction identification tends to be consistent with the known identification; and
  performing a global pooling operation for the basic feature expression of the base image to obtain a global feature expression, inputting the global feature expression into a fourth identity identifier, the fourth identity identifier predicting a fourth prediction identification of the pedestrian in the base image according to the global feature expression; detecting whether the fourth prediction identification is consistent with the known identification, and if not consistent, adjusting the feature extraction model and parameters of the fourth identity identifier so that the fourth prediction identification tends to be consistent with the known identification.

9. A computer device, wherein the device comprises:
one or more processors,
a memory for storing one or more programs,
the one or more programs, when executed by said one or more processors, enable said one or more processors to implement a pedestrian re-identification method, wherein the method comprises:
  collecting a target image and a to-be-identified image including a pedestrian image;
  obtaining a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image, wherein a feature complying with a search expression of the base image is obtained, from a basic feature expression of the base image, as the self-attention feature of the base image, wherein the search expression of the base image is obtained by performing a global pooling operation for the basic feature expression of the base image to obtain global feature expressions, and then performing feature transformation;
  identifying whether a pedestrian in the to-be-identified image is the same pedestrian as that in the target image according to the feature expression of the target image and the feature expression of the to-be-identified image.

10. The computer device according to claim 9, wherein the identifying whether a pedestrian in the to-be-identified image is the same pedestrian as that in the target image according to the feature expression of the target image and the feature expression of the to-be-identified image comprises:
  if the feature expression is a global feature expression, calculating a similarity between the global feature expression of the target image and the global feature expression of the to-be-identified image;
  judging whether the similarity is greater than a preset similarity threshold, and if yes, determining that the pedestrian in the corresponding to-be-identified image is the same pedestrian as that in the target image.

11. The computer device according to claim 10, wherein before the step of, if the feature expression is a basic feature expression, calculating a similarity between the global feature expression of the target image and the global feature expression of the to-be-identified image, the method further comprises:
  performing a global pooling operation for the basic feature expression of the target image and the basic feature expression of the to-be-identified image respectively, to obtain the global feature expression of the target image and the global feature expression of the to-be-identified image.

12. The computer device according to claim 9, wherein before the obtaining a feature expression of the target image and a feature expression of the to-be-identified image respectively, based on a pre-trained feature extraction model, the method further comprises:

collecting several training images and known identification of pedestrians included in each of the training images, to constitute a training image set together;

generating several sets of training data according to the training image set, each set of training data comprising a base image and at least one reference image;

training the feature extraction model with respective sets of training data and known identifications of pedestrians included in base images in the respective sets of training data.

13. The computer device according to claim 12, wherein the training the feature extraction model with respective sets of training data and known identifications of pedestrians included in base images in the respective sets of training data comprises:

for the sets of training data, training the feature extraction model based on the self-attention features of the base images in the corresponding training data;

training the feature extraction model based on the co-attention features of the base images in the corresponding training data relative to the respective reference images.

14. The computer device according to claim 13, wherein the step of, for the sets of training data, training the feature extraction model based on the self-attention features of the base images in the corresponding training data comprises:

for the sets of training data, inputting the base images in the corresponding training data into the feature extraction model, and obtaining basic feature expressions and search expressions of the base images output by the feature extraction model;

inputting the self-attention feature of the base image into a first identity identifier, the first identity identifier predicting a first prediction identification of the pedestrian in the base image according to the self-attention feature of the base image;

detecting whether the first prediction identification is consistent with the known identification, and if not consistent, adjusting the feature extraction model and parameters of the first identity identifier so that the first prediction identification tends to be consistent with the known identification.

15. The computer device according to claim 14, wherein the training the feature extraction model based on the co-attention features of the base images in the corresponding training data relative to the respective reference images comprises:

for each of the reference images in each set of training data, inputting the reference image into the feature extraction model, and obtaining the search expression of the reference image output by the feature extraction model;

obtaining, from the basic feature expression of a corresponding base image, a feature complying with the search expression of the reference image as the co-attention feature of the base image relative to the reference image;

inputting the co-attention feature into a second identity identifier, the second identity identifier predicting a second prediction identification of the pedestrian in the base image according to the co-attention feature;

detecting whether the second prediction identification is consistent with the known identification, and if not consistent, adjusting the feature extraction model and parameters of the second identity identifier so that the second prediction identification tends to be consistent with the known identification.

16. The computer device according to claim 14, wherein the training the feature extraction model with respective sets of training data and known identifications of pedestrians included in base images in the respective sets of training data further comprises at least one of the following:

for each set of training data, inputting the search expression of the base image in the training data into a third identity identifier, the third identity identifier predicting a third prediction identification of the pedestrian in the base image according to the search expression of the base image; detecting whether the third prediction identification is consistent with the known identification, and if not consistent, adjusting the feature extraction model and parameters of the third identity identifier so that the third prediction identification tends to be consistent with the known identification; and performing a global pooling operation for the basic feature expression of the base image to obtain a global feature expression, inputting the global feature expression into a fourth identity identifier, the fourth identity identifier predicting a fourth prediction identification of the pedestrian in the base image according to the global feature expression; detecting whether the fourth prediction identification is consistent with the known identification, and if not consistent, adjusting the feature extraction model and parameters of the fourth identity identifier so that the fourth prediction identification tends to be consistent with the known identification.

17. A non-transitory computer readable medium on which a computer program is stored, wherein the program, when executed by a processor, implements a pedestrian re-identification method, wherein the method comprises:

collecting a target image and a to-be-identified image including a pedestrian image;

obtaining a feature expression of the target image and a feature expression of the to-be-identified image respectively, based on a pre-trained feature extraction model; wherein the feature extraction model is obtained by training based on a self-attention feature of a base image as well as a co-attention feature of the base image relative to a reference image, wherein a feature complying with a search expression of the base image is obtained, from a basic feature expression of the base image, as the self-attention feature of the base image, wherein the search expression of the base image is obtained by performing a global pooling operation for the basic feature expression of the base image to obtain global feature expressions, and then performing feature transformation;

identifying whether a pedestrian in the to-be-identified image is the same pedestrian as that in the target image according to the feature expression of the target image and the feature expression of the to-be-identified image.

18. The non-transitory computer readable medium according to claim 17, wherein the identifying whether a pedestrian in the to-be-identified image is the same pedestrian as that in the target image according to the feature expression of the target image and the feature expression of the to-be-identified image comprises:

if the feature expression is a global feature expression, calculating a similarity between the global feature expression of the target image and the global feature expression of the to-be-identified image;

judging whether the similarity is greater than a preset similarity threshold, and if yes, determining that the pedestrian in the corresponding to-be-identified image is the same pedestrian as that in the target image.

19. The non-transitory computer readable medium according to claim 18, wherein before the step of, if the feature expression is a basic feature expression, calculating a similarity between the global feature expression of the target image and the global feature expression of the to-be-identified image, the method further comprises:

performing a global pooling operation for the basic feature expression of the target image and the basic feature expression of the to-be-identified image respectively, to obtain the global feature expression of the target image and the global feature expression of the to-be-identified image.

20. The non-transitory computer readable medium according to claim 17, wherein before the obtaining a feature expression of the target image and a feature expression of the to-be-identified image respectively, based on a pre-trained feature extraction model, the method further comprises:

collecting several training images and known identification of pedestrians included in each of the training images, to constitute a training image set together;

generating several sets of training data according to the training image set, each set of training data comprising a base image and at least one reference image;

training the feature extraction model with respective sets of training data and known identifications of pedestrians included in base images in the respective sets of training data.

* * * * *